United States Patent
Tafreshi et al.

(10) Patent No.: US 10,076,721 B2
(45) Date of Patent: Sep. 18, 2018

(54) SYSTEMS AND METHODS FOR SHORT LOOP REGENERATION OF GAS DEHYDRATION UNITS

(71) Applicant: Chevron U.S.A. Inc., San Ramon, CA (US)

(72) Inventors: Saham Sam Tafreshi, Humble, TX (US); Kamal Gursahani, Houston, TX (US); Yawen Q. Owen, Houston, TX (US); Robert E. Marshall, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 122 days.

(21) Appl. No.: 15/407,561

(22) Filed: Jan. 17, 2017

(65) Prior Publication Data

US 2018/0200664 A1 Jul. 19, 2018

(51) Int. Cl.
*B01D 53/26* (2006.01)
*B01D 53/04* (2006.01)

(52) U.S. Cl.
CPC ....... *B01D 53/0438* (2013.01); *B01D 53/261* (2013.01); *B01D 2253/116* (2013.01); *B01D 2257/80* (2013.01); *B01D 2259/4009* (2013.01)

(58) Field of Classification Search
CPC .............. B01D 53/0438; B01D 53/261; B01D 2253/116; B01D 2257/80; B01D 2259/4009
USPC ..... 95/115, 117–120, 122–124; 96/121, 133, 96/144; 34/472, 473, 80
See application file for complete search history.

(56) References Cited

U.S. PATENT DOCUMENTS

| | | | | |
|---|---|---|---|---|
| 2,629,460 A | * | 2/1953 | Maki | B01D 53/26 137/110 |
| 3,894,856 A | * | 7/1975 | Lofredo | C07C 7/005 62/614 |
| 4,784,672 A | * | 11/1988 | Sircar | B01D 53/0462 95/123 |
| 2010/0251887 A1 | * | 10/2010 | Jain | B01D 53/0462 95/46 |
| 2012/0042689 A1 | * | 2/2012 | Bresler | B01D 53/0438 62/611 |

* cited by examiner

*Primary Examiner* — Frank M Lawrence, Jr.
(74) *Attorney, Agent, or Firm* — Karen R. DiDomenicis

(57) ABSTRACT

Water saturated molecular sieve in a gas dehydration unit is regenerated. A short loop is used in which regeneration gas is recycled to a heater upstream of a vessel in regeneration mode. The regeneration gas passes over the molecular sieve in the vessel to desorb water thereby regenerating the molecular sieve. The short loop also includes a condenser, a water separator and a compressor. The regeneration gas is not recycled to the AGRU at the front-end of the plant, thus the regeneration gas flow rate can be increased, as it is not limited by the front-end capacity of the plant. Moreover, the pressure of the system during regeneration can be reduced within the limits of system hydraulics. By using the short loop, the total time required for regeneration can also be reduced. The embodiments disclosed can de-bottleneck molecular sieve regeneration constraints in LNG, LPG or cryogenic gas plants.

10 Claims, 3 Drawing Sheets

SYSTEMS AND METHODS FOR SHORT LOOP REGENERATION OF GAS DEHYDRATION UNITS

FIELD

The present disclosure relates to the field of gas dehydration units that utilize adsorption beds containing molecular sieve, and further relates to systems and methods for regenerating the adsorption beds in such gas dehydration units. The gas is then subjected to cryogenic cooling to form liquefied gas.

BACKGROUND

In conventional natural gas conditioning, natural gas, having passed through an acid gas removal unit (AGRU) and dewpoint control, is often dehydrated by passing the natural gas through a system of vessels or units referred to as a dehydration unit including adsorption beds made up of molecular sieve particulate material, also referred to as mole sieve. Such a system includes at least two vessels in which one of the vessels contains saturated molecular sieve that is in regeneration mode, while the other one or more vessels are operated in dehydration or adsorption mode. During dehydration mode, water is adsorbed onto the molecular sieve material; and during regeneration mode, water is desorbed from the molecular sieve. Typically, the regeneration is effected by passing hot dry natural gas, i.e., natural gas having been dehydrated, over the saturated molecular sieve. This requires a large compressor to return hot dry natural gas to a location upstream of the AGRU upstream of the dehydration unit.

Dehydration of natural gas is typically accomplished by flowing the gas over zeolite-based molecular sieve adsorbent. Water in the gas is preferentially adsorbed by the molecular sieve. Removal of water from the gas using molecular sieve dehydration is a vital process component in any liquefied natural gas (LNG) plant to meet moisture content specifications (down to 0.1 ppmv). Natural gas can contain additional contaminants such as hydrogen sulfide, mercaptans, carbonyl sulfide, etc. that are partially co-adsorbed by the molecular sieve. During high pressure regeneration, system design problems can result in water and hydrocarbon refluxing, poor water desorption, and high residual water content within the molecular sieve after regeneration. This can result in early moisture breakthrough and economic losses associated with frequent molecular sieve change outs and low dehydrator availability During regeneration, a regeneration gas can be used to heat the molecular sieve bed to desorb water. If the molecular sieve bed is regenerated at high temperature and low pressure, then the regeneration gas may be a slip stream of dry gas, storage tank boil off gas, or any other suitable dry gases. If the regeneration is conducted at high pressure and large vessel diameters, then the vessel thickness and choice of materials will create additional heat load on the regeneration system. In addition, the high operating regeneration pressure can result in water and hydrocarbon refluxing and lower desorption rate and efficiency.

The regeneration gas may contain contaminants such as oxygen that reacts with hydrogen, hydrogen sulfide and/or hydrocarbon (e.g. propane) at high regeneration temperatures resulting in the formation of unwanted by-products such as sulfur, sulfur di-oxides, water and carbon dioxide. These by-products can build up in downstream units, or in the fuel system causing problems such as fouling, and off-specification products. Furthermore, the complete regeneration of molecular sieves is not achieved because of the contaminants present resulting in sub-optimal performance of the dehydration unit. This may also be accompanied by damage caused to the molecular sieve resulting in reduced operating life. One known solution is further purification of the regeneration gas by using additional adsorbents. However, such schemes are expensive and will not always result in full contaminant removal of the regeneration gas.

Referring to FIG. 1, dehydration of a gas such as natural gas feed stream 1 is typically done by flowing a wet gas 23 over a bed of zeolite-based molecular sieve adsorbent material (not shown) in a vessel 2A. As a result the molecular sieve adsorbent material becomes saturated with water and must be regenerated after a period of use. The adsorbent is regenerated in vessel 2R at high temperature by flowing dry regeneration gas 3, which is typically a slip stream of dried process gas 4, over the bed of molecular sieve adsorbent material. The regeneration gas is then cooled in a condenser 5, free water 6 is separated in a separator 11 and removed, and the remaining gas 7 is compressed by a compressor 8 and returned through line 46 to the front-end of the plant, upstream of the acid gas removal unit 9 which also receives the feed gas 1. The quantity of regeneration gas 3 available is limited by the capacity of the recycle compressor 8, regeneration gas heater 10, regeneration gas cooler (also referred to as condenser) 5 and the capacity of the front-end equipment in the system including the acid gas removal unit 9. If there are any problems with the dehydration unit not being able to meet dried gas specifications, very little can be done to improve the regeneration of the molecular sieves due to these overall system constraints.

There exists a need for a more robust, more flexible and less costly method and system for regenerating saturated molecular sieve in a gas dehydration unit, particularly which increase the availability of regeneration gas.

SUMMARY

In one aspect, a system is provided for dehydrating a gas feed stream in a system to produce liquefied natural gas, liquefied petroleum gas, or cryogenic gas. At least two vessels are arranged in parallel for containing molecular sieve material for adsorbing water from a gas feed stream passed over the molecular sieve material. Each of the at least two vessels has two ends wherein each end has an opening and wherein each opening can act as a vessel inlet or a vessel outlet depending on a direction of fluid flow through each of the at least two vessels. One of the at least two vessels is in regeneration mode and the other(s) of the at least two vessels is(are) in adsorption mode at a given time during a cycle in which the vessel in regeneration mode alternates among the at least two vessels. The vessel in regeneration mode has a regeneration gas inlet and a regeneration gas outlet and the vessel(s) in adsorption mode each have a feed gas inlet and a dried gas outlet. Gas from an acid gas removal unit is fed into the feed gas inlet(s) of the vessel(s) in adsorption mode. Dried gas leaves the dried gas outlet(s) of the vessel(s) in adsorption mode to be further processed in a liquefied natural gas, liquefied petroleum gas, or cryogenic gas plant. A conduit is in communication with the dried gas outlet(s) of the vessel(s) in adsorption mode for passing a slip stream of the dried gas to the regeneration gas inlet of the vessel in regeneration mode such that the slip stream is used as a regeneration gas for passing over and thereby desorbing water from the molecular sieve material within the vessel in regeneration mode. A heater heats the regeneration gas prior to passing the regeneration gas to the vessel in regeneration mode to a temperature sufficient to desorb the water from the molecular sieve material. A condenser in communication with the regeneration gas outlet of the vessel in regeneration mode is used to form a stream containing condensed water and gas. A separator separates the stream into a water stream and a regeneration gas stream. A compressor compresses the regeneration gas stream. A conduit is used for passing the regeneration gas stream from the compressor to a location upstream of the heater for heating the regeneration gas stream to the temperature sufficient to desorb the water from the molecular sieve material.

In one aspect, a method is provided for dehydrating the gas feed stream using the system described above. The vessel in regeneration mode remains in regeneration mode until the water has been sufficiently desorbed from the molecular sieve material.

DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

DETAILED DESCRIPTION

Figure 2:
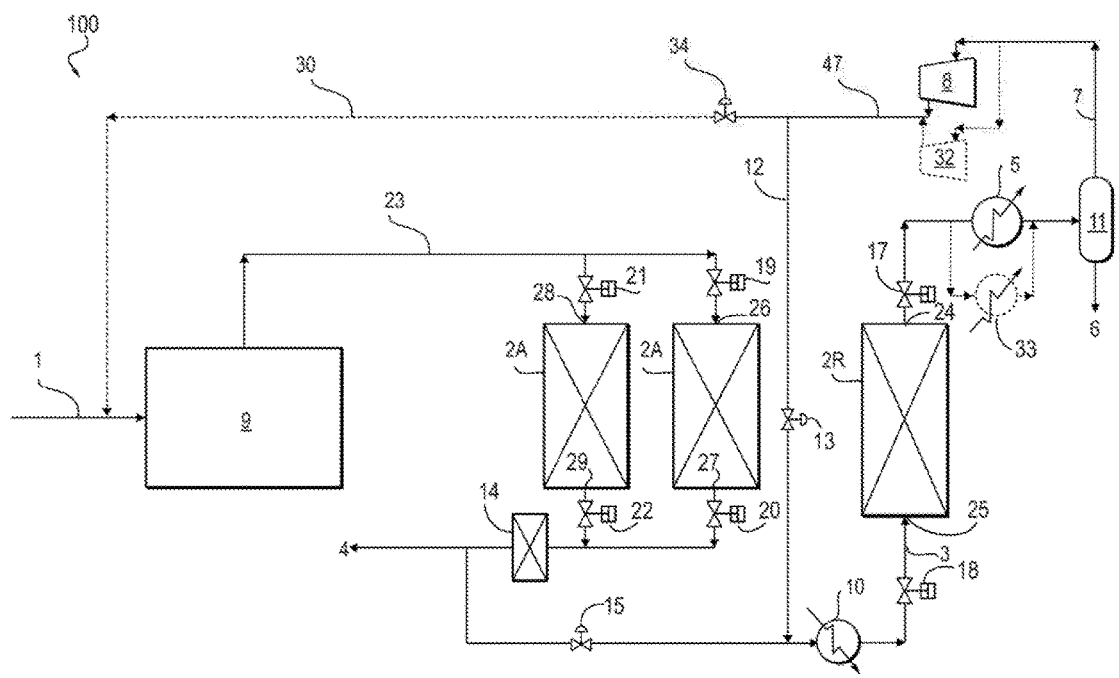
FIGS. 2-3 are schematic diagrams illustrating gas dehydration units according to exemplary embodiments.

In one embodiment, referring to FIG. 2, a system 100 and its operation for regenerating water saturated molecular sieve in a gas dehydration unit used in a process for dehydrating a gas feed stream 1 will now be described. The gas dehydration unit is used in a system to produce liquefied natural gas, liquefied petroleum gas, or cryogenic gas. The gas dehydration unit includes at least two adsorbent bed containing vessels (2A, 2A and 2R) arranged in parallel. In one embodiment, as shown, the system comprises three vessels arranged in parallel. Four or more vessels could also be used. As shown, those vessels in adsorption mode also referred to as dehydration mode are labeled 2A while those vessels in regeneration mode are labeled 2R. At any given time, one of the at least two vessels is in regeneration mode and the other(s) of the at least two vessels is (are) in adsorption mode. The vessel in regeneration mode alternates among each of the at least two vessels in a complete cycle. The vessel in regeneration mode 2R has a regeneration gas inlet 25 and a regeneration gas outlet 24, and the vessel(s) in adsorption mode 2A each have a feed gas inlet (28, 26) and a dried gas outlet (22, 20).

Vessels 2A are shown in dehydration mode or adsorption mode, such that moisture containing gas 23 enters at the top of the vessels and dehydrated gas 4 exits at the bottom of the vessels. The moisture containing gas 23 may be provided from an acid gas removal unit (AGRU) 9 is fed into the feed gas inlet(s) of the vessel(s) 2A in adsorption mode.

Vessel 2R in regeneration mode contains saturated molecular sieve material. As shown, vessel 2R has a regeneration gas inlet 25 at the bottom thereof, and a regeneration gas outlet 24 at the top thereof. In some embodiments (not shown), vessel 2R can have the regeneration gas inlet at the top of the vessel and the regeneration gas outlet at the bottom of the vessel, as would be apparent to one of ordinary skill in the art. Each of the at least two vessels has two ends wherein each end has an opening therein. Each opening acts as either a vessel inlet or a vessel outlet depending on the direction of fluid flow through the vessel. In one embodiment, a valve is located proximate and in fluid communication with each of the two ends of the vessels for controlling flow to and from the opening, acting as either a vessel inlet or vessel outlet. As shown, the vessel 2R has an upper opening 24 with valve 17 located proximate opening 24, and a lower opening 25 with valve 18 proximate opening 25. Similarly, vessels 2A have upper openings 28 and 26, respectively and valves 21 and 19, respectively, and lower openings 29 and 27, respectively and valves 22 and 20, respectively.

Figure 1:
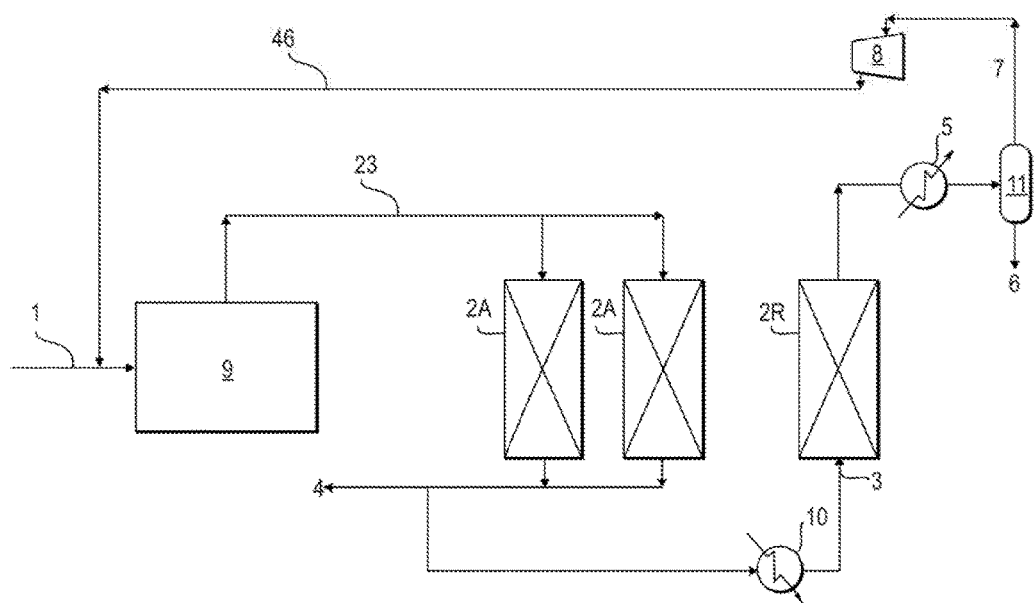
FIG. 1 is a simplified schematic diagram illustrating a gas dehydration unit according to the prior art.

Dehydrated gas is filtered in filter 14. As in the prior art system shown in FIG. 1, dehydration of a gas (such as, but not limited to natural gas) feed stream 1 is typically done by flowing a water-containing gas 23 to be dehydrated over a bed of zeolite-based molecular sieve adsorbent material, also referred to as molecular sieve material (not shown), in a vessel 2A, such that the molecular sieve material adsorbs water from a water-containing gas stream passed over the molecular sieve material. Dried gas leaves the dried gas outlet(s) of the vessel(s) in adsorption mode to be further processed in a liquefied natural gas, liquefied petroleum gas, or cryogenic gas plant.

After a period of use, the molecular sieve adsorbent material becomes saturated with water and must be regenerated for a period of time to remove the water. Following regeneration, the molecular sieve material is typically cooled prior to returning the molecular sieve material to service in adsorption mode.

The adsorbent is regenerated in vessel 2R at high temperature by flowing a regeneration gas 3 over the bed of molecular sieve adsorbent material in vessel 2R. The regeneration gas 3 is typically initiated by taking a slip stream of filtered dried process gas 4 using valve 15 in a conduit in communication with the dried gas outlet(s) 22, 20 of the vessel(s) in adsorption mode 2A. The regeneration gas 3 is heated in heater 10 to a temperature sufficient to desorb water from the saturated molecular sieve and is passed to the regeneration gas inlet 25 of the vessel in regeneration mode 2R such that the slip stream is used as a regeneration gas for passing over and thereby desorbing water from the molecular sieve material within the vessel 2R.

The regeneration gas then leaves the vessel 2R and is cooled in a condenser 5 in communication with the regeneration gas outlet 24 of the vessel 2R for cooling an overhead stream from the regeneration gas outlet 24 to form a stream containing water and gas. Optionally, an additional condenser 33 can also be provided as needed. The stream passes to a separator (also referred to as a knock out drum) 11 where free water 6 is separated and removed and a gas stream 7 also referred to as the regeneration gas stream is formed. The regeneration gas stream 7 is then compressed by a compressor 8. Optionally, an additional compressor 32 can also be provided as needed.

Rather than returning the compressed regeneration gas stream through line 46 to the front-end of the plant, upstream of the acid gas removal unit 9, also referred to as the "long loop," the compressed regeneration gas stream is instead directed through a "short loop" by directing the gas through a section of conduit 12 (and conduit 47 in the scheme as shown) to a location upstream of regeneration gas heater 10 prior to being fed to the regeneration gas inlet 25. The long loop is the same as the current path of compressed regeneration gas labeled as 46 in FIG. 1. Valve 13 is provided in conduit 12 for controlling flow through the short loop. The regeneration gas will be recycled and recirculated within the short loop by the compressor 8 and continued to be used to regenerate the molecular sieve in vessel 2R until the desorbing of water from the molecular sieve material within vessel 2R is sufficiently complete, i.e., until the molecular sieve has been adequately regenerated such that it is ready to be returned to service in adsorption mode.

Thus, in one embodiment, system 100 regenerates the molecular sieve in vessel 2R through a process of bulk regeneration in which a large flow of water-saturated gas passes through the short loop consisting of the vessel 2R, a condenser 5, a separator 11, a compressor 8, and piping 47 and 12 to direct the compressed regeneration gas to the heater 10 upstream of the regeneration gas inlet 25 of vessel 2R.

As the gas no longer flows through the front-end of the plant (i.e., the long loop), the regeneration gas flow in this circuit (i.e., the short loop) can advantageously be increased, as it is not limited by the front-end capacity of the plant viz. the AGRU 9. Moreover, as the gas does not flow back to the front-end, the pressure of the system during regeneration can be reduced within the limits of system hydraulics. The compressed regeneration gas, also referred to herein as the regeneration gas stream, though not completely dry, will have a much higher actual volumetric flow rate through the molecular sieve bed of vessel 2R which will provide improved heat and mass transfer and thereby effectively desorb a significant quantity of water and other contaminants adsorbed on the molecular sieve bed.

In one embodiment, system 100 further includes a conduit 30 for passing the regeneration gas stream from the compressor to a location upstream of the AGRU 9. In this embodiment, the process of bulk regeneration is followed by an optional polishing step using a lower volumetric flow (relative to the flow rate used in the short loop) of completely dry gas in the long loop. As shown in FIG. 2, the long loop consists of piping 47 and 30 to direct regeneration gas to a location upstream of the AGRU 9. A valve 34 is provided to control flow into the line 30. The optional polishing can achieve complete water removal and cooling of the molecular sieve bed.

As mentioned, following regeneration of a vessel, the vessel is typically cooled. In the cooling step, regeneration gas follows nearly the same path as during regeneration, except that the regeneration gas bypasses the heater, such that cool regeneration gas is passed into the molecular sieve bed to return it to a temperature that is appropriate for adsorption.

LNG plants have been known to experience performance and reliability issues in their molecular sieve dehydration units. The embodiments disclosed herein are intended to de-bottleneck such molecular sieve regeneration issues. For example, if a designed regeneration gas flow rate is insufficient given the size of the vessels 2A and 2R, radial heat transfer to the vessel walls is limited, resulting in an excessive amount of time to regenerate the outer portions of the bed. Ultimately, this limits the flow rate through the molecular sieves and overall LNG production. The use of the embodiments disclosed herein would advantageously address such issues by significantly increasing the regeneration gas flow rate, which will improve heat transfer throughout the bed and result in more effective regeneration. By separating the regeneration process into a short loop and long loop cycle, the total time required for regeneration can also be reduced. This will improve the molecular sieve dehydrator performance and allow for more LNG throughput. The embodiments disclosed herein can be used in future new designs, to reduce capital expense, operating expense and improve reliability. Capital expense can be reduced by potentially reducing the number of beds required as a result of the shortened cycle times. Existing plants can also be retrofitted to implement the embodiments disclosed herein to address underperforming or bottlenecked dehydration units. Additionally, the embodiments disclosed herein enable regeneration at lower pressures resulting in more effective regeneration. Lower pressure regeneration enables better gas distribution through the molecular sieve bed, resulting in reduced residual water content.

In one embodiment, heat generated by the recycle compressor 8 can be utilized to increase the heating capacity of the circulating regeneration gas.

In one embodiment, contaminant buildup in the system can be reduced as water 6 is removed from the separator 11. At high regeneration temperatures, mercaptans will decompose to H2S and oxygen will react away with the hydrocarbons.

Figure 3:
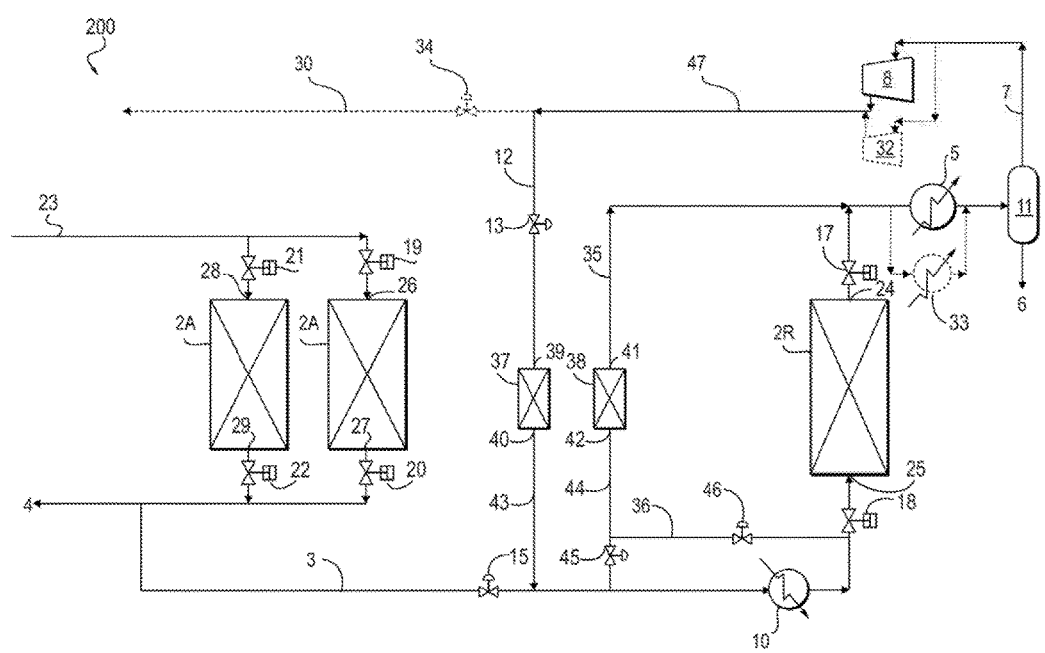

In one embodiment, referring to FIG. 3, an alternative system 200 and its operation for regenerating water saturated molecular sieve in a gas dehydration unit will now be described. System 200 is similar to system 100 with the addition of an optional second dehydration unit for further removing moisture from the regeneration gas stream. The second dehydration unit includes a pair of vessels 37 and 38 arranged in parallel and containing molecular sieve material. The pair of vessels 37 and 38 alternate between absorption and regeneration modes. As shown in FIG. 3, vessel 37 is in adsorption mode and vessel 38 is in regeneration mode. Vessel 37 is located in the short loop located between conduit 12 and conduit 43 for passing the regeneration gas stream from the compressor 8 to a location upstream of the heater 10. Vessel 38 is located in the short loop between conduit 44 and conduit 35. Vessels 37 and 38 are smaller than vessels 2A and 2R. In one nonlimiting example, the primary larger dehydration vessels 2A and 2R have an inner diameter of about 5 meters and tangent-to-tangent height of about 9 meters. The secondary smaller dehydration vessels 37 and 38 have an inner diameter of about 3 meters and tangent-to-tangent height of about 7 meters. In this example, each smaller dehydrator vessel has a bed volume that is roughly 25% of the larger dehydrator bed volume.

Each of vessels 37 and 38 have openings at each end thereof, as shown vessel 37 has openings 39 and 40, and vessel 38 has openings 41 and 42, which openings act as inlets or outlets depending on the direction of flow. A valve 45 can be provided in the conduit 42 for controlling flow between vessel 38 and a location upstream of heater 10. Likewise, a valve 46 in a conduit 36 can be provided to control flow between vessel 38 and a location downstream of heater 10. Other valving and piping will be present as would be apparent to one of ordinary skill in the art. Prior to passing the regeneration gas stream to the regeneration gas inlet 25 of vessel 2R, the regeneration gas stream is passed through the second dehydration unit (i.e., vessel 37 of the pair of vessels 37 and 38), thereby further removing moisture from the regeneration gas stream. Thus system 200 regenerates the molecular sieves in a short loop using regeneration gas that has been completely dried by a smaller molecular sieve unit.

When vessel 38 is in regeneration mode, heated regeneration gas is taken from downstream of the heater 10. Additionally, during regeneration mode, some amount of unheated regeneration gas taken from upstream of the heater 10 can be mixed with the heated regeneration gas to control the regeneration gas temperature, thus providing operational flexibility to regenerate vessel 38 at a lower temperature than vessel 2R. After having been regenerated, vessel 38 can be cooled using unheated regeneration gas taken from upstream of the heater 10. Conduit 36 is the piping through which a slip stream of hot regeneration gas flows when the dehydrator vessel 38 is in regeneration mode. The flow is controlled by control valve 46. When dehydrator vessel 38 goes into regeneration mode required heated gas, valve 46 opens. When dehydrator vessel 38 goes into cooling mode following regeneration, valve 46 closes, and valve 45 opens so unheated regeneration gas flows through the dehydrator vessel 38.

In the embodiment shown in FIG. 3, the regeneration gas from the compressor(s) 8 is not sent back to the front-end of the plant, i.e. to AGRU 9. Instead, the regeneration gas is diverted to the smaller vessels 37 and 38, one in adsorption and one in regeneration modes. The smaller vessel in adsorption 37 removes the remaining moisture so that the regeneration gas is rendered completely dry. This dry gas is then heated in heater 10 and is used to regenerate the existing molecular sieve bed in vessel 2R. To regenerate the smaller vessel in adsorption 37, a slip stream is taken from either upstream or downstream of the heater 10 (depending on whether the vessel 2R is in heating or cooling). Use of the short loop as shown does not involve recycling gas back to the AGRU 9. This results in greater operational flexibility and higher possible LNG throughput.

Advantages of the embodiment shown in FIG. 3 include the following. The regeneration gas is completely dry throughout the entire regeneration cycle, so that the regeneration time can be further reduced, beyond the regeneration time reduction of the embodiment shown in FIG. 2. The short loop operates independently of the AGRU 9. No regeneration gas is recycled back to the front-end of the plant, so the feed flow rate and LNG throughput can be increased accordingly.

In embodiments in which no recycle stream passes back to the AGRU 9, smaller equipment sizes can potentially be used for the AGRU 9 and associated equipment.

Disclosed herein are various embodiments of short loop regeneration systems and methods. The embodiments disclosed herein are intended to be used in new gas plants or in retrofits of existing gas plants, particularly those having an inadequate regeneration system in which regeneration gas flow rate and contamination issues are concerns.

It should be noted that only the components relevant to the disclosure are shown in the figures, and that many other components normally part of a gas dehydration system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A system for dehydrating a gas feed stream in a system to produce liquefied natural gas, liquefied petroleum gas, or cryogenic gas, comprising:
   a. at least two vessels arranged in parallel for containing molecular sieve material for adsorbing water from a gas feed stream passed over the molecular sieve material wherein:
      i. each of the at least two vessels has two ends wherein each end has an opening and wherein each opening can act as a vessel inlet or a vessel outlet depending on a direction of fluid flow through each of the at least two vessels;
      ii. one of the at least two vessels is in regeneration mode and the other(s) of the at least two vessels is(are) in adsorption mode at a given time during a cycle in which the vessel in regeneration mode alternates among the at least two vessels;
      iii. the vessel in regeneration mode has a regeneration gas inlet and a regeneration gas outlet and the vessel(s) in adsorption mode each have a feed gas inlet and a dried gas outlet;
      iv. gas from an acid gas removal unit is fed into the feed gas inlet(s) of the vessel(s) in adsorption mode; and
      v. dried gas leaves the dried gas outlet(s) of the vessel(s) in adsorption mode to be further processed in a liquefied natural gas, liquefied petroleum gas, or cryogenic gas plant;
   b. a conduit in communication with the dried gas outlet(s) of the vessel(s) in adsorption mode for passing a slip stream of the dried gas to the regeneration gas inlet of the vessel in regeneration mode such that the slip stream is used as a regeneration gas for passing over and thereby desorbing water from the molecular sieve material within the vessel in regeneration mode;
   c. a heater for heating the regeneration gas prior to passing the regeneration gas to the vessel in regeneration mode to a temperature sufficient to desorb the water from the molecular sieve material;
   d. a condenser in communication with the regeneration gas outlet of the vessel in regeneration mode for condensing water in an overhead stream from the regeneration gas outlet to form a stream containing water and gas;

e. a separator for separating the water and the gas from the stream containing water and gas thereby forming a water stream and a regeneration gas stream;

f. a compressor for compressing the stream of regeneration gas stream; and g. a conduit for passing the regeneration gas stream from the compressor to a location upstream of the heater such that the regeneration gas stream can be heated to the temperature sufficient to desorb the water from the molecular sieve material.

2. The system of claim 1, further comprising a valve located proximate and in communication with each of the two ends of the at least two vessels for controlling flow to and from each opening.

3. The system of claim 1, wherein the system comprises three vessels arranged in parallel.

4. The system of claim 1, further comprising a conduit for passing the regeneration gas stream from the compressor to a location upstream of the acid gas removal unit.

5. The system of claim 1, further comprising a second dehydration unit for further removing moisture from the regeneration gas stream wherein the second dehydration unit comprises a pair of vessels arranged in parallel and containing molecular sieve material, wherein the pair of vessels alternate between absorption and regeneration modes, wherein at a given time, the vessel of the pair of vessels that is in absorption mode is located in the conduit for passing the regeneration gas stream from the compressor to the location upstream of the heater and the vessel of the pair of vessels that is in regeneration mode is located in a second conduit configured to receive a second slip stream of the regeneration gas from upstream and/or downstream of the heater, wherein the second slip stream regenerates the vessel of the pair of vessels that is in regeneration mode.

6. The system of claim 5, further comprising a valve for controlling flow of the regeneration gas between a location upstream of the heater and the vessel of the pair of vessels that is in regeneration mode.

7. The system of claim 5, further comprising a valve for controlling flow of the regeneration gas between a location downstream of the heater and the vessel of the pair of vessels that is in regeneration mode.

8. A method for regenerating a molecular sieve bed in a dehydration unit for dehydrating a gas feed stream in a system to produce liquefied natural gas, liquefied petroleum gas, or cryogenic gas wherein the gas dehydration unit comprises at least two vessels arranged in parallel for containing molecular sieve material for adsorbing water from a gas feed stream passed over the molecular sieve material wherein each of the at least two vessels has two ends wherein each end has an opening and wherein each opening can act as a vessel inlet or a vessel outlet depending on a direction of fluid flow through each of the at least two vessels one of the at least two vessels is in regeneration mode and the other(s) of the at least two vessels is(are) in adsorption mode at a given time during a cycle in which the vessel in regeneration mode alternates among the at least two vessels; the vessel in regeneration mode has a regeneration gas inlet and a regeneration gas outlet and the vessel(s) in adsorption mode each have a feed gas inlet and a dried gas outlet; gas from an acid gas removal unit is fed into the feed gas inlet(s) of the vessel(s) in adsorption mode; and dried gas leaves the dried gas outlet(s) of the vessel(s) in adsorption mode to be further processed in a liquefied natural gas or cryogenic gas plant; the method comprising:

a. passing a slip stream of the dried gas from the dried gas outlet(s) of the vessel(s) in adsorption mode to the regeneration gas inlet of the vessel in regeneration mode such that the slip stream is used as a regeneration gas for passing over and thereby desorbing water from the molecular sieve material within the vessel in regeneration mode;

b. heating the regeneration gas prior to passing the regeneration gas to the regeneration gas inlet of the vessel in regeneration mode to a temperature sufficient to desorb the water from the molecular sieve material;

c. condensing water in an overhead stream from the regeneration gas outlet of the vessel in regeneration mode to form a stream containing water and gas;

d. separating the water and the gas from the stream thereby forming a water stream and a regeneration gas stream;

e. compressing the regeneration gas stream;

f. recycling the regeneration gas stream from the compressor to a location upstream of the heater;

g. heating the regeneration gas stream to the temperature sufficient to desorb the water from the molecular sieve material;

h. passing the regeneration gas stream over and thereby desorbing water from the molecular sieve material within the vessel in regeneration mode; and i. repeating steps (c) through (h) until the desorbing of water from the molecular sieve material within the vessel in regeneration mode is sufficiently complete.

9. The method of claim 8, further comprising:

j. cooling the vessel regenerated in steps (a) through (i) to prepare the vessel for use in adsorption mode by repeating steps (c) through (e); recycling the regeneration gas stream from the compressor to a location downstream of the heater; passing the regeneration gas stream over the molecular sieve material within the vessel; and k. repeating step (j) until the molecular sieve material is sufficiently cooled to prepare the vessel for use in adsorption mode.

10. The method of claim 8, wherein prior to recycling the regeneration gas stream from the compressor to a location upstream of the heater, the regeneration gas stream is passed through a second dehydration unit comprising a pair of vessels containing molecular sieve material arranged in parallel and alternating between absorption and regeneration modes, thereby further removing moisture from the regeneration gas stream, wherein the vessel of the pair of vessels in regeneration mode receives a second slip stream of the regeneration gas taken from upstream and/or downstream of the heater, wherein the second slip stream regenerates the vessel of the pair of vessels that is in regeneration mode when the second slip stream of the regeneration gas is taken from downstream of the heater and the second slip stream of the regeneration gas cools the vessel of the pair of vessels that is in regeneration mode when the second slip stream of the regeneration gas is taken from upstream of the heater.

* * * * *